(12) United States Patent
Sasaki

(10) Patent No.: US 11,598,238 B2
(45) Date of Patent: Mar. 7, 2023

(54) EXHAUST GAS PURIFICATION DEVICE

(71) Applicant: SUBARU CORPORATION, Tokyo (JP)

(72) Inventor: Yasuyoshi Sasaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/142,327

(22) Filed: Jan. 6, 2021

(65) Prior Publication Data

US 2021/0254529 A1 Aug. 19, 2021

(30) Foreign Application Priority Data

Feb. 14, 2020 (JP) .............................. JP2020-022991

(51) Int. Cl.
| | | |
|---|---|---|
| *F01N 3/00* | (2006.01) | |
| *F01N 3/20* | (2006.01) | |
| *F01N 9/00* | (2006.01) | |
| *F01N 3/10* | (2006.01) | |

(52) U.S. Cl.
CPC ........... *F01N 3/2053* (2013.01); *F01N 3/101* (2013.01); *F01N 9/00* (2013.01); *F01N 2410/03* (2013.01); *F01N 2550/02* (2013.01)

(58) Field of Classification Search
CPC .......... F01N 3/2053; F01N 9/00; F01N 3/101; F01N 2550/02; F01N 2410/03
See application file for complete search history.

(56) References Cited

U.S. PATENT DOCUMENTS

| | | | | |
|---|---|---|---|---|
| 5,467,594 | A * | 11/1995 | Aoki | F01N 3/0878 60/276 |
| 5,979,157 | A * | 11/1999 | Kinugasa | F01N 3/0878 60/274 |
| 6,370,872 | B1 * | 4/2002 | Watanabe | F01N 3/101 60/288 |
| 6,401,451 | B1 * | 6/2002 | Yasui | F01N 13/0093 60/277 |
| 2002/0053199 | A1 * | 5/2002 | Sato | F01N 11/00 60/277 |
| 2003/0106304 | A1 * | 6/2003 | Miyahara | F02D 41/222 60/277 |

(Continued)

FOREIGN PATENT DOCUMENTS

| | | | |
|---|---|---|---|
| JP | H06159048 A | * | 6/1994 |
| JP | 2010-253447 A | | 11/2010 |

*Primary Examiner* — Matthew T Largi
(74) *Attorney, Agent, or Firm* — Troutman Pepper Hamilton Sanders LLP

(57) ABSTRACT

An exhaust gas purification device includes a first catalyst, a second catalyst, a bypass pipe, a hydrocarbon adsorbent, and a switching controller. The first catalyst is provided in an exhaust pipe. The second catalyst is provided downstream of the first catalyst in the exhaust pipe. The bypass pipe branches from a first portion of the exhaust pipe. The first portion is located upstream of the second catalyst. The bypass pipe is recoupled to a second portion of the exhaust pipe. The second portion is located upstream of the second catalyst. The hydrocarbon adsorbent is provided in the bypass pipe. The switching controller is configured to switch a flow path of an exhaust gas to the bypass pipe based on a deterioration degree of the first catalyst.

10 Claims, 4 Drawing Sheets

(56) References Cited

U.S. PATENT DOCUMENTS

| | | | | |
|---|---|---|---|---|
| 2004/0003723 A1* | 1/2004 | Ueno | .............. | B01D 53/0454 |
| | | | | 96/110 |
| 2007/0214775 A1* | 9/2007 | I | .............. | F01N 13/009 |
| | | | | 60/299 |
| 2010/0077735 A1* | 4/2010 | Tanaka | .............. | F01N 3/0835 |
| | | | | 60/287 |
| 2010/0307135 A1* | 12/2010 | Miyamoto | .............. | F02D 41/1441 |
| | | | | 60/277 |
| 2010/0319327 A1* | 12/2010 | Sano | .............. | B60W 10/06 |
| | | | | 60/286 |
| 2011/0082031 A1* | 4/2011 | Brown | .............. | B01J 20/3238 |
| | | | | 502/304 |
| 2011/0192138 A1* | 8/2011 | Bailey | .............. | F01N 11/00 |
| | | | | 60/274 |
| 2011/0232269 A1* | 9/2011 | Inoue | .............. | F02M 26/05 |
| | | | | 60/276 |
| 2012/0040824 A1 | 2/2012 | Itou et al. | | |
| 2012/0216508 A1* | 8/2012 | Collins | .............. | F01N 11/007 |
| | | | | 60/274 |

\* cited by examiner

EXHAUST GAS PURIFICATION DEVICE

CROSS-REFERENCE TO RELATED APPLICATIONS

The present application claims priority from Japanese Patent Application No. 2020-022991 filed on Feb. 14, 2020, the entire contents of which are hereby incorporated by reference.

BACKGROUND

The disclosure relates to an exhaust gas purification device including a three-way catalyst.

A three-way catalyst is provided in an exhaust pipe of a vehicle in order to remove hydrocarbons (HC), carbon monoxide (CO), and nitrogen oxides ($NO_x$) contained in an exhaust gas (for example, Japanese Unexamined Patent Application Publication No. 2010-253447). The three-way catalyst oxidizes hydrocarbons into water and carbon dioxide ($CO_2$), oxidizes carbon monoxide into carbon dioxide, and reduces nitrogen oxides into nitrogen ($N_2$).

SUMMARY

An aspect of the disclosure provides an exhaust gas purification device including a first catalyst, a second catalyst, a bypass pipe, a hydrocarbon adsorbent, and a switching controller. The first catalyst is provided in an exhaust pipe. The second catalyst is provided downstream of the first catalyst in the exhaust pipe. The bypass pipe branches from a first portion of the exhaust pipe. The first portion is located upstream of the second catalyst. The bypass pipe is recoupled to a second portion of the exhaust pipe. The second portion is located upstream of the second catalyst. The hydrocarbon adsorbent is provided in the bypass pipe. The switching controller is configured to switch a flow path of an exhaust gas to the bypass pipe based on a deterioration degree of the first catalyst.

An aspect of the disclosure provides an exhaust gas purification device including a first catalyst, a second catalyst, a bypass pipe, a hydrocarbon adsorbent, and circuitry. The first catalyst is provided in an exhaust pipe. The second catalyst is provided downstream of the first catalyst in the exhaust pipe. The bypass pipe branches from a first portion of the exhaust pipe. The first portion is located upstream of the second catalyst. The bypass pipe is recoupled to a second portion of the exhaust pipe. The second portion is located upstream of the second catalyst. The hydrocarbon adsorbent is provided in the bypass pipe. The circuitry is configured to switch a flow path of an exhaust gas to the bypass pipe based on a deterioration degree of the first catalyst.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

During an engine start, an air-fuel ratio is made rich in order to warm up the engine early. Therefore, during the engine start, an exhaust gas contains a relatively large amount of hydrocarbons.

On the other hand, during the engine start, a temperature of the exhaust gas is relatively low, and thus a hydrocarbon removal capacity of the three-way catalyst is lower than that during normal operation. When the three-way catalyst deteriorates, the hydrocarbon removal capacity decreases. To deal with this issue, a content of precious metal in the three-way catalyst is increased such that hydrocarbons can be removed during the engine start even if the three-way catalyst deteriorates. Therefore, cost of the three-way catalyst may increase.

It is desirable to provide an exhaust gas purification device that can improve a removal rate of hydrocarbons at low cost.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Engine System 100

Figure 1:
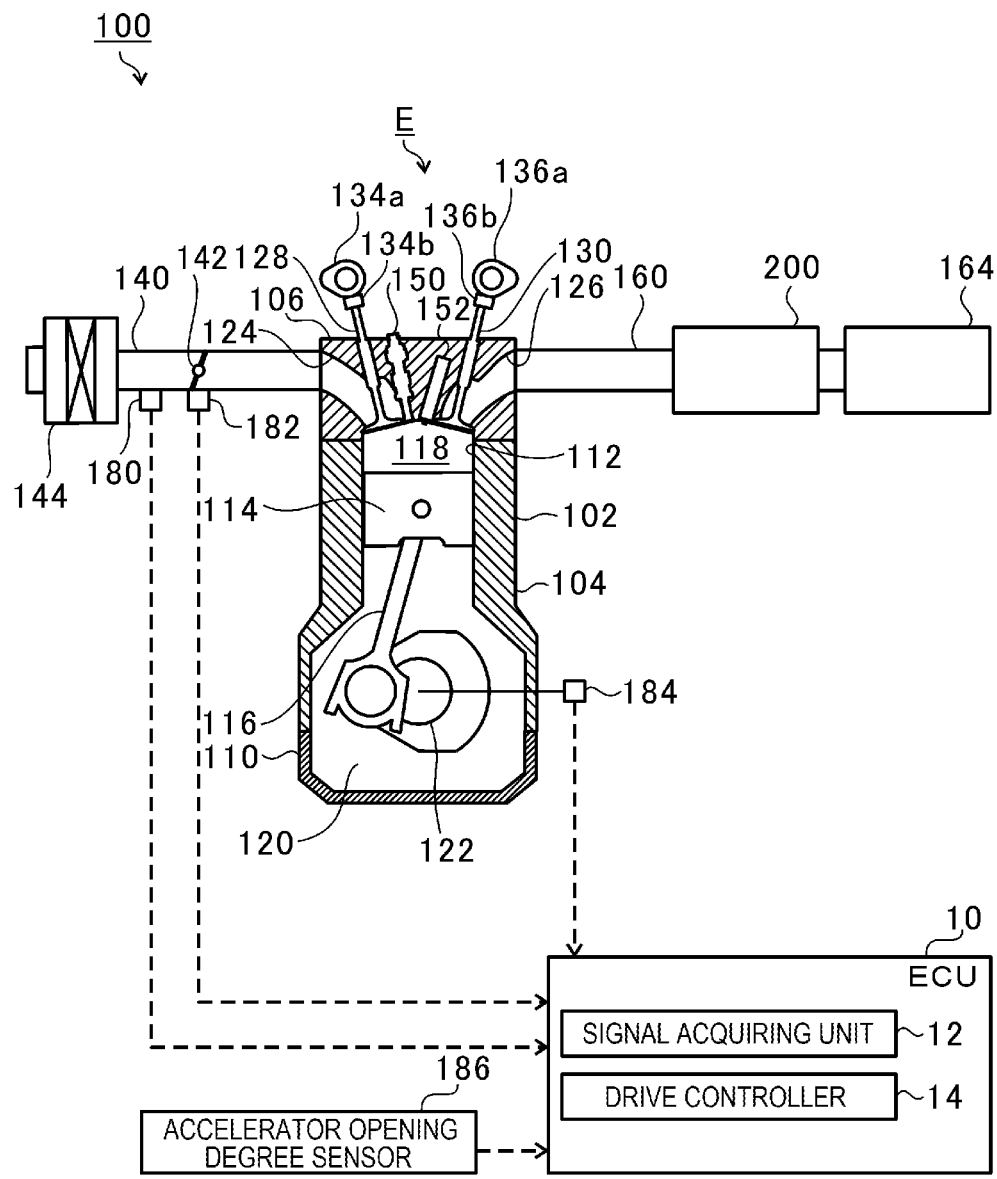
FIG. 1 illustrates an engine system according to an embodiment.

FIG. 1 illustrates an engine system 100 according to the present embodiment. In FIG. 1, dashed arrows indicate signal flows.

As illustrated in FIG. 1, the engine system 100 mounted on a vehicle is provided with an engine control unit (ECU) 10 implemented by a microcomputer including a central processing unit (CPU), a ROM storing a program, and a RAM serving as a work area. The overall engine E is controlled by the ECU 10 in an integrated manner. In the following, configurations and processing related to the present embodiment will be described in detail, and descriptions of configurations and processing unrelated to the present embodiment may be omitted.

The engine E constituting the engine system 100 includes a cylinder block 102, a crankcase 104, a cylinder head 106, and an oil pan 110. The crankcase 104 is permanently affixed to the cylinder block 102. The cylinder head 106 is joined to the cylinder block 102 on a side opposite to the crankcase 104. The oil pan 110 is joined to the crankcase 104 on a side opposite to the cylinder block 102.

Multiple cylinder bores 112 are formed in the cylinder block 102. In each cylinder bore 112, a piston 114 is slidably supported by a connecting rod 116. In the engine E, a space surrounded by the cylinder bore 112, the cylinder head 106, and a crown surface of the piston 114 is a combustion chamber 118.

In the engine E, a space surrounded by the crankcase 104 and the oil pan 110 is a crank chamber 120. A crankshaft 122 is rotatably supported in the crank chamber 120. The piston 114 is coupled to the crankshaft 122 via the connecting rod 116.

The cylinder head 106 is provided with an intake port 124 and an exhaust port 126 such that the intake port 124 and the exhaust port 126 communicate with the combustion chamber 118. A tip end (that is, a head) of an intake valve 128 is located between the intake port 124 and the combustion chamber 118. A tip end (that is, a head) of an exhaust valve 130 is located between the exhaust port 126 and the combustion chamber 118.

An intake cam 134a, a rocker arm 134b, an exhaust cam 136a, and a rocker arm 136b are provided in a space surrounded by the cylinder head 106 and a head cover (not illustrated). The intake cam 134a fixed to an intake camshaft is in contact with the intake valve 128 via the rocker arm 134b. The intake valve 128 moves in an axial direction along with rotation of the intake camshaft so as to open and close between the intake port 124 and the combustion chamber 118. The exhaust cam 136a fixed to an exhaust camshaft is in contact with the exhaust valve 130 via the rocker arm 136b. The exhaust valve 130 moves in the axial direction along with rotation of the exhaust camshaft so as to open and close between the exhaust port 126 and the combustion chamber 118.

An intake pipe 140 including an intake manifold communicates with an upstream portion of the intake port 124. A throttle valve 142 and an air cleaner 144 upstream of the throttle valve 142 are provided in the intake pipe 140. The throttle valve 142 is opened and closed by an actuator according to an opening degree of an accelerator (not illustrated). Air purified by the air cleaner 144 is suctioned into the combustion chamber 118 through the intake pipe 140 and the intake port 124.

The cylinder head 106 is provided with an injector 150 (that is, a fuel injector) and an ignition plug 152. A fuel injection port of the injector 150 opens to the combustion chamber 118. A tip end of the ignition plug 152 is located in the combustion chamber 118. The fuel injected from the injector 150 into the combustion chamber 118 mixes with the air supplied from the intake port 124 to the combustion chamber 118 to form an air-fuel mixture. Then, the ignition plug 152 is ignited at a predetermined timing, and the generated air-fuel mixture is combusted in the combustion chamber 118. With such combustion, the piston 114 reciprocates, and the reciprocation is converted into a rotational movement of the crankshaft 122 through the connecting rod 116.

An exhaust pipe 160 including an exhaust manifold communicates with a downstream part of the exhaust port 126. An exhaust gas purification device 200 is provided in the exhaust pipe 160. The exhaust gas purification device 200 purifies an exhaust gas discharged from the exhaust port 126. A specific configuration of the exhaust gas purification device 200 will be described in detail later. The exhaust gas purified by the exhaust gas purification device 200 is exhausted to the outside through a muffler 164.

The engine system 100 is provided with an intake air amount sensor 180, a throttle opening degree sensor 182, a crank angle sensor 184, and an accelerator opening degree sensor 186.

The intake air amount sensor 180 detects an intake air amount flowing into the engine E. The throttle opening degree sensor 182 detects an opening degree of the throttle valve 142. The crank angle sensor 184 detects a crank angle of the crankshaft 122. The accelerator opening degree sensor 186 detects an opening degree of the accelerator (not illustrated).

The intake air amount sensor 180, the throttle opening degree sensor 182, the crank angle sensor 184, and the accelerator opening degree sensor 186 are coupled to the ECU 10 and output signals indicating detected values to the ECU 10, respectively.

The ECU 10 acquires the signals output from the intake air amount sensor 180, the throttle opening degree sensor 182, the crank angle sensor 184, and the accelerator opening degree sensor 186, and an air-fuel ratio sensor 260, a downstream air-fuel ratio sensor 262, and a temperature sensor 264, which will be described later, and controls the engine E. The ECU 10 serves as a signal acquiring unit 12 and a drive controller 14 when controlling the engine E.

The signal acquiring unit 12 acquires the signals indicating the values detected by the intake air amount sensor 180, the throttle opening degree sensor 182, the crank angle sensor 184, and the accelerator opening degree sensor 186. The signal acquiring unit 12 derives a rotation speed of the engine E (that is, a rotation speed of the crankshaft) based on the signal indicating the crank angle acquired from the crank angle sensor 184. The signal acquiring unit 12 also derives a load of the engine E (that is, an engine load) based on the signal indicating the intake air amount acquired from the intake air amount sensor 180. Since various existing techniques may be used to calculate the engine load based on the intake air amount, the description thereof will be omitted here.

The drive controller 14 controls a throttle valve actuator (not illustrated), the injector 150, and the ignition plug 152 based on the signals acquired by the signal acquiring unit 12.

Figure 2:
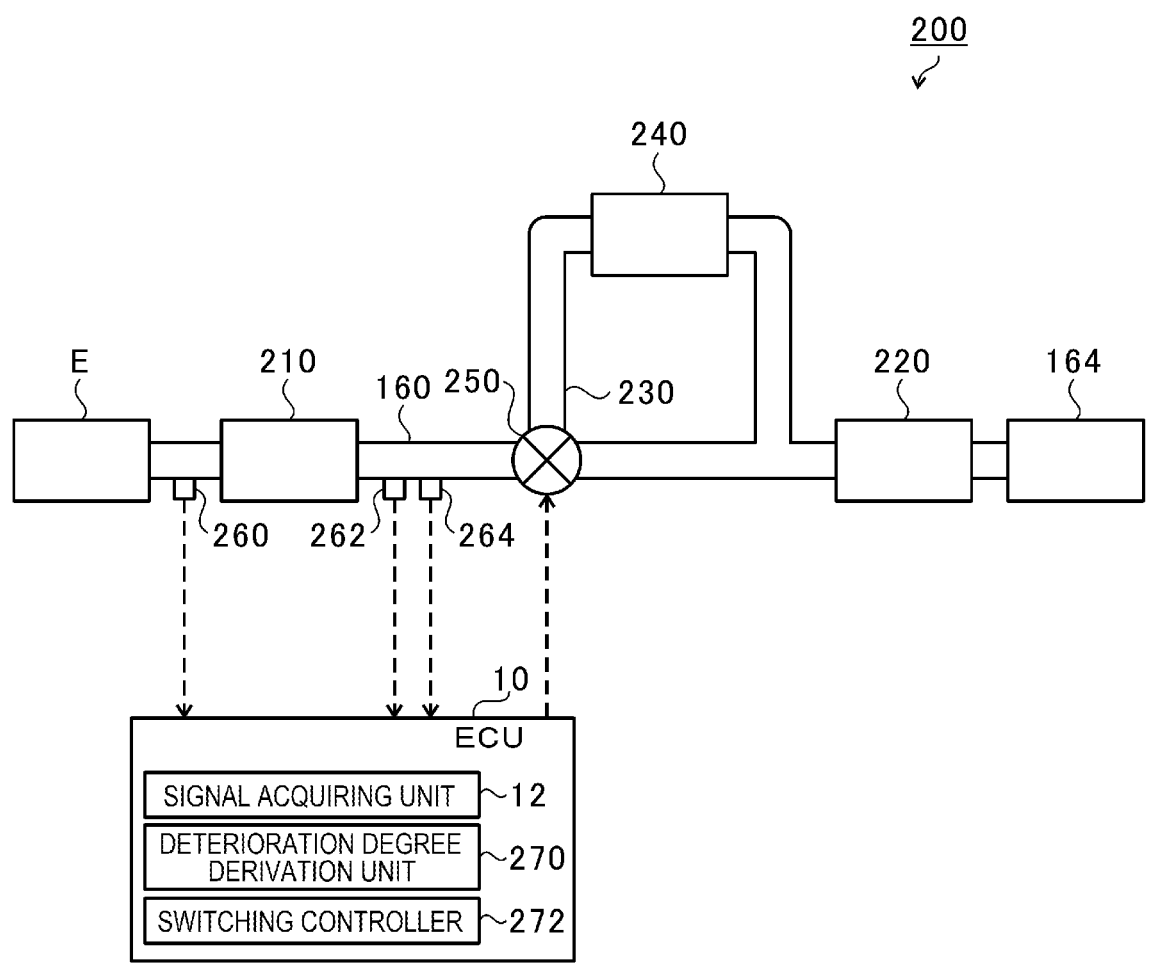
FIG. 2 illustrates the configuration of an exhaust gas purification device according to the embodiment.

The ECU 10 serves as the signal acquiring unit 12, a deterioration degree derivation unit 270, and a switching controller 272 when serving as the exhaust gas purification device 200 (see FIG. 2). The deterioration degree derivation unit 270 and the switching controller 272 will be described later in detail.

Exhaust Gas Purification Device 200

FIG. 2 illustrates the configuration of the exhaust gas purification device 200 according to the present embodiment. In FIG. 2, dashed arrows indicate signal flows.

As illustrated in FIG. 2, the exhaust gas purification device 200 includes a front stage catalyst 210, a rear stage catalyst 220, a bypass pipe 230, a hydrocarbon adsorbent 240, a switching valve 250, the air-fuel ratio sensor 260, the downstream air-fuel ratio sensor 262, the temperature sensor 264, the signal acquiring unit 12, the deterioration degree derivation unit 270, and the switching controller 272.

The front stage catalyst 210 is provided in the exhaust pipe 160. In one embodiment, the front stage catalyst 210 may serve as a "first catalyst". The rear stage catalyst 220 is provided downstream of the front stage catalyst 210 in the exhaust pipe 160. In one embodiment, the rear stage catalyst 220 may serve as a "second catalyst". In other words, the rear stage catalyst 220 is provided between the front stage catalyst 210 and the muffler 164 in the exhaust pipe 160.

The front stage catalyst 210 and the rear stage catalyst 220 are three-way catalysts. The front stage catalyst 210 and the rear stage catalyst 220 purify (remove) hydrocarbons, carbon monoxide, and nitrogen oxides contained in the exhaust gas. The front stage catalyst 210 and the rear stage catalyst 220 contain a precious metal material, an oxygen storage capacity (OSC) material, and alumina ($Al_2O_3$). The precious metal material contains any one or more of platinum (Pt), palladium (Pd), or rhodium (Rh). The OSC material contains a ceria (that is, cerium oxide (IV) ($CeO_2$))-zirconia (that is, zirconium dioxide ($ZrO_2$)) composite. Ceria has an oxygen storage capacity (OSC). The rear stage catalyst 220 has a smaller amount of precious metal material than that of the front stage catalyst 210.

The bypass pipe 230 branches from between the front stage catalyst 210 and the rear stage catalyst 220 in the exhaust pipe 160, and is recoupled to between the front stage catalyst 210 and the rear stage catalyst 220 in the exhaust pipe 160. A branch position of the bypass pipe 230 is located upstream of a recoupling position of the bypass pipe 230.

The hydrocarbon adsorbent 240 is provided in the bypass pipe 230. The hydrocarbon adsorbent 240 adsorbs hydrocarbons at a predetermined adsorption temperature. The hydrocarbon adsorbent 240 desorbs hydrocarbons at a predetermined desorption temperature. The adsorption temperature is, for example, normal temperature (25° C.) or more and 200° C. or less. The desorption temperature is, for example, 300° C. or more and 400° C. or less. In the present embodiment, the hydrocarbon adsorbent 240 is zeolite (for example, molecular sieve).

The switching valve 250 is provided at the branch position between the exhaust pipe 160 and the bypass pipe 230. The switching valve 250 switches a flow path of the exhaust gas between the exhaust pipe 160 and the bypass pipe 230.

The air-fuel ratio sensor 260 detects an air-fuel ratio of the exhaust gas exhausted from the engine E. In the present embodiment, the air-fuel ratio sensor 260 detects the air-fuel ratio of the exhaust gas passing through an upstream side of the front stage catalyst 210 in the exhaust pipe 160.

The downstream air-fuel ratio sensor 262 detects an oxygen concentration of the exhaust gas that has passed through the front stage catalyst 210. In the present embodiment, the downstream air-fuel ratio sensor 262 detects the oxygen concentration of the exhaust gas passing between the front stage catalyst 210 and the branch position of the bypass pipe 230 in the exhaust pipe 160.

The temperature sensor 264 detects a temperature of the exhaust gas introduced into the hydrocarbon adsorbent 240. In the present embodiment, the temperature sensor 264 measures the temperature of the exhaust gas passing between the front stage catalyst 210 and the branch position of the bypass pipe 230 in the exhaust pipe 160.

The signal acquiring unit 12 acquires signals indicating values detected by the air-fuel ratio sensor 260, the downstream air-fuel ratio sensor 262, and the temperature sensor 264.

The deterioration degree derivation unit 270 derives a deterioration degree of the front stage catalyst 210 based on the detected value of the air-fuel ratio sensor 260 and the detected value of the downstream air-fuel ratio sensor 262. As described above, the front stage catalyst 210 contains the OSC material. Therefore, when the front stage catalyst 210 is not deteriorated, the air-fuel ratio of the exhaust gas becomes a theoretical air-fuel ratio in a process in which the exhaust gas passes through the front stage catalyst 210.

Therefore, for example, the deterioration degree derivation unit 270 derives a difference (hereinafter, referred to as "air-fuel ratio difference") between the air-fuel ratio detected by the air-fuel ratio sensor 260 and an air-fuel ratio derived from the detected value of the downstream air-fuel ratio sensor 262. Then, the deterioration degree derivation unit 270 derives the deterioration degree of the front stage catalyst 210 based on the air-fuel ratio difference. The air-fuel ratio difference decreases as the deterioration degree of the front stage catalyst 210 increase. The deterioration degree derivation unit 270 derives the air-fuel ratio difference when the air-fuel ratio detected by the air-fuel ratio sensor 260 is not the theoretical air-fuel ratio. The derived deterioration degree of the front stage catalyst 210 is stored in a memory (not illustrated).

Then, the switching controller 272 switches the flow path of the exhaust gas to the bypass pipe 230 based on the deterioration degree of the front stage catalyst 210. In the present embodiment, the switching controller 272 controls the switching valve 250 based on the deterioration degree.

The switching controller 272 controls the switching valve 250 with reference to switching information stored in the memory. The switching information is information indicating a deterioration threshold Td and a temperature threshold Tt. The deterioration threshold Td is set to an upper limit value of the deterioration degree of the front stage catalyst 210 at which the front stage catalyst 210 can remove hydrocarbons to a target value even during the engine E start. The temperature threshold Tt is set to the desorption temperature of the hydrocarbon adsorbent 240 (for example, a predetermined value in a range of 300° C. (inclusive) to 400° C. (inclusive).

Then, when the deterioration degree of the front stage catalyst 210 is equal to or higher than the deterioration threshold Td and the temperature of the exhaust gas detected by the temperature sensor 264 is less than the temperature threshold Tt, the switching controller 272 controls the switching valve 250 to switch the flow path of the exhaust gas to the bypass pipe 230 until the temperature of the exhaust gas detected by the temperature sensor 264 reaches the temperature threshold Tt.

On the other hand, when the deterioration degree of the front stage catalyst 210 is equal to or higher than the deterioration threshold Td and the detected value of the temperature sensor 264 reaches the temperature threshold Tt (that is, the detected value is equal to or higher than the temperature threshold Tt), the switching controller 272 controls the switching valve 250 to switch the flow path of the exhaust gas to the exhaust pipe 160. That is, the switching controller 272 stops introduction of the exhaust gas into the bypass pipe 230.

When the deterioration degree of the front stage catalyst 210 is less than the deterioration threshold Td, the switching controller 272 sets the flow path of the exhaust gas to the exhaust pipe 160 regardless of the temperature of the exhaust gas detected by the temperature sensor 264.

Method for Purifying Exhaust Gas

Figure 3:
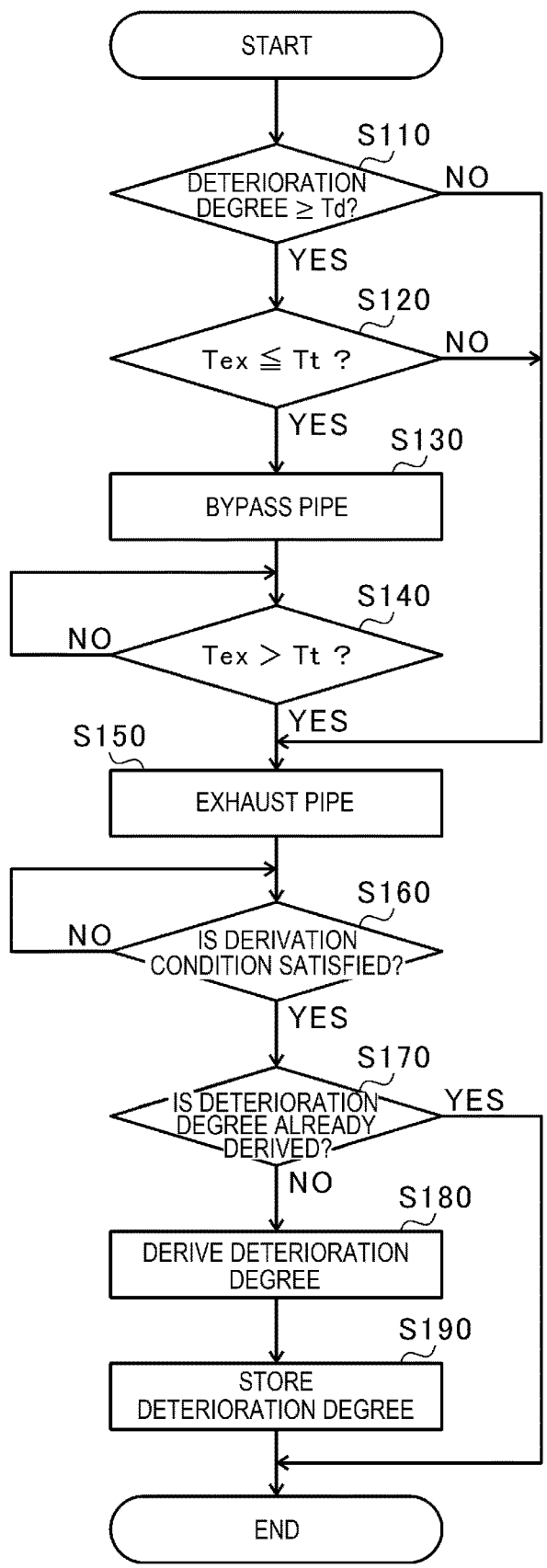
FIG. 3 is a flowchart illustrating a method for purifying an exhaust gas.

Next, a method for purifying an exhaust gas with the exhaust gas purification device 200 will be described. FIG. is a flowchart illustrating the method for purifying an exhaust gas. As illustrated in FIG. 3, the method for purifying an exhaust gas includes a process of making a determination based on the deterioration degree (S110), a first temperature determination process (S120), a process of switching to the bypass pipe (S130), a second temperature determination process (S140), a process of switching to the exhaust pipe (S150), a process of determining if a condition is satisfied (S160), a process of determining whether to derive the deterioration degree (S170), a process of deriving the deterioration degree (S180), and a process of storing the deterioration degree (S190). The method for purifying an exhaust gas is started when receiving engine start input from the user. Hereinafter, each process will be described.

Process of Making Determination based on Deterioration Degree (S110)

The switching controller 272 determines whether the deterioration degree stored in the memory in a previous operation cycle is equal to or higher than the deterioration threshold Td. The term "operation cycle" refers to a period from a time of starting the engine E to a time of stopping the engine E. As a result, when determining that the deterioration degree is equal to or higher than the deterioration threshold Td (YES in S110), the switching controller 272 proceeds to the first temperature determination process (S120). On the other hand, when determining that the deterioration degree is not equal to or higher than the deterioration threshold Td, that is, is less than the deterioration threshold Td (NO in S110), the switching controller 272 proceeds to the process of switching to the exhaust pipe (S150).

First Temperature Determination Process (S120)

The switching controller 272 determines whether a temperature Tex of the exhaust gas introduced into the hydrocarbon adsorbent 240 (a temperature of the exhaust gas detected by the temperature sensor 264) is equal to or less than the temperature threshold Tt. As a result, when determining that the temperature Tex is equal to or less than the temperature threshold Tt (YES in S120), the switching controller 272 proceeds to the process of switching to the bypass pipe (S130). On the other hand, when determining that the temperature Tex is not equal to or less than the temperature threshold Tt, that is, exceeds the temperature threshold Tt (NO in S120), the switching controller 272 proceeds to the process of switching to the exhaust pipe (S150).

The switching controller 272 executes the first temperature determination process S120, so that it is possible to avoid a situation in which the exhaust gas is introduced into the hydrocarbon adsorbent 240 when the engine E is already warmed up since a time from the previous operation cycle to a current operation cycle is short.

Process of Switching to Bypass Pipe (S130)

The switching controller 272 controls the switching valve 250 to switch the flow path of the exhaust gas to the bypass pipe 230 (that is, the hydrocarbon adsorbent 240). Second Temperature Determination Process (S140)

The switching controller 272 determines whether the temperature Tex of the exhaust gas introduced into the hydrocarbon adsorbent 240 exceeds the temperature threshold Tt. Then, the switching controller 272 waits until the temperature Tex exceeds the temperature threshold Tt (NO in S140), and once the temperature Tex exceeds the temperature threshold Tt (YES in S140), the switching controller 272 proceeds to the process of switching to the exhaust pipe (S150).

Process of Switching to Exhaust Pipe (S150)

The switching controller 272 controls the switching valve 250 to switch the flow path of the exhaust gas to the exhaust pipe 160.

Process of Determining if Condition is Satisfied (S160)

The switching controller 272 determines whether a condition to be satisfied when the deterioration degree the front stage catalyst 210 is derived is satisfied. Hereinafter, the condition to be satisfied when the deterioration degree the front stage catalyst 210 is derived will be referred to as a "derivation condition". The derivation condition is, for example, that the air-fuel ratio is not the theoretical air-fuel ratio for a normal operation. Then, the switching controller 272 waits until the derivation condition is satisfied (NO in S160), and once the derivation condition is satisfied (YES in S160), the switching controller 272 proceeds to the process of determining whether to derive the deterioration degree (S170).

Process of Determining Whether to Derive Deterioration Degree (S170)

The switching controller 272 determines whether the deterioration degree is already derived in the current operation cycle. When determining that the deterioration degree is not derived yet (NO in S170), the switching controller 272 proceeds to the process of deriving the deterioration degree (S180). On the other hand, when determining that the deterioration degree is already derived (YES in S170), the switching controller 272 ends the method for purifying an exhaust gas.

Process of Deriving Deterioration Degree (S180)

The deterioration degree derivation unit 270 derives the air-fuel ratio difference based on the detected value of the air-fuel ratio sensor 260 and the detected value of the downstream air-fuel ratio sensor 262, and derives the deterioration degree of the front stage catalyst 210 based on the air-fuel ratio difference.

Process of Storing Deterioration Degree (S190)

The deterioration degree derivation unit 270 overwrites the deterioration degree derived in the process of deriving the deterioration degree (S180) in the memory, and ends the method for purifying an exhaust gas.

As described above, the exhaust gas purification device 200 of the present embodiment purifies the exhaust gas with the front stage catalyst 210 and the rear stage catalyst 220 until the front stage catalyst 210 deteriorates. Then, if the front stage catalyst 210 deteriorates, the exhaust gas purification device 200 causes the hydrocarbon adsorbent 240 to adsorb hydrocarbons that cannot be purified by the front stage catalyst 210 during the engine start. With this configuration, the exhaust gas purification device 200 can improve a removal rate of hydrocarbons during the engine start without increasing an amount of the precious metal material of the front stage catalyst 210. Therefore, the exhaust gas purification device 200 can improve the removal rate of hydrocarbons at low cost.

As described above, when the temperature threshold Tt is exceeded, since the temperature of the front stage catalyst 210 reaches an activation temperature, the front stage catalyst 210 can purify the exhaust gas even if the front stage catalyst 210 deteriorates. Therefore, when the temperature threshold Tt is exceeded, the switching controller 272 stops introduction of the exhaust gas into the hydrocarbon adsorbent 240, so that it is possible to prevent a leakage of hydrocarbons while preventing deterioration of the hydrocarbon adsorbent 240.

When the exhaust gas introduced into the hydrocarbon adsorbent 240 reaches about the temperature threshold Tt, hydrocarbons are desorbed from the hydrocarbon adsorbent 240. At about the temperature threshold Tt, the rear stage catalyst 220 can purify the exhaust gas, so that the hydrocarbons desorbed from the hydrocarbon adsorbent 240 is purified by the rear stage catalyst 220.

As described above, the bypass pipe 230 is provided between the front stage catalyst 210 and the rear stage catalyst 220. That is, the hydrocarbon adsorbent 240 is provided between the front stage catalyst 210 and the rear stage catalyst 220. With this configuration, the hydrocarbon adsorbent 240 can simply adsorb hydrocarbons that cannot be purified by the front stage catalyst 210. Therefore, the exhaust gas purification device 200 can reduce a size of the hydrocarbon adsorbent 240.

The above embodiment describes, as an example, the configuration in which the bypass pipe 230 is provided between the front stage catalyst 210 and the rear stage catalyst 220 in the exhaust pipe 160. However, an installation position of the bypass pipe 230 is not limited to this configuration as long as the bypass pipe 230 branches from a first portion of the exhaust pipe 160 that is located upstream of the rear stage catalyst 220 and is recoupled to a second portion of the exhaust pipe 160 that is located upstream of the rear stage catalyst 220.

Modification

Figure 4:
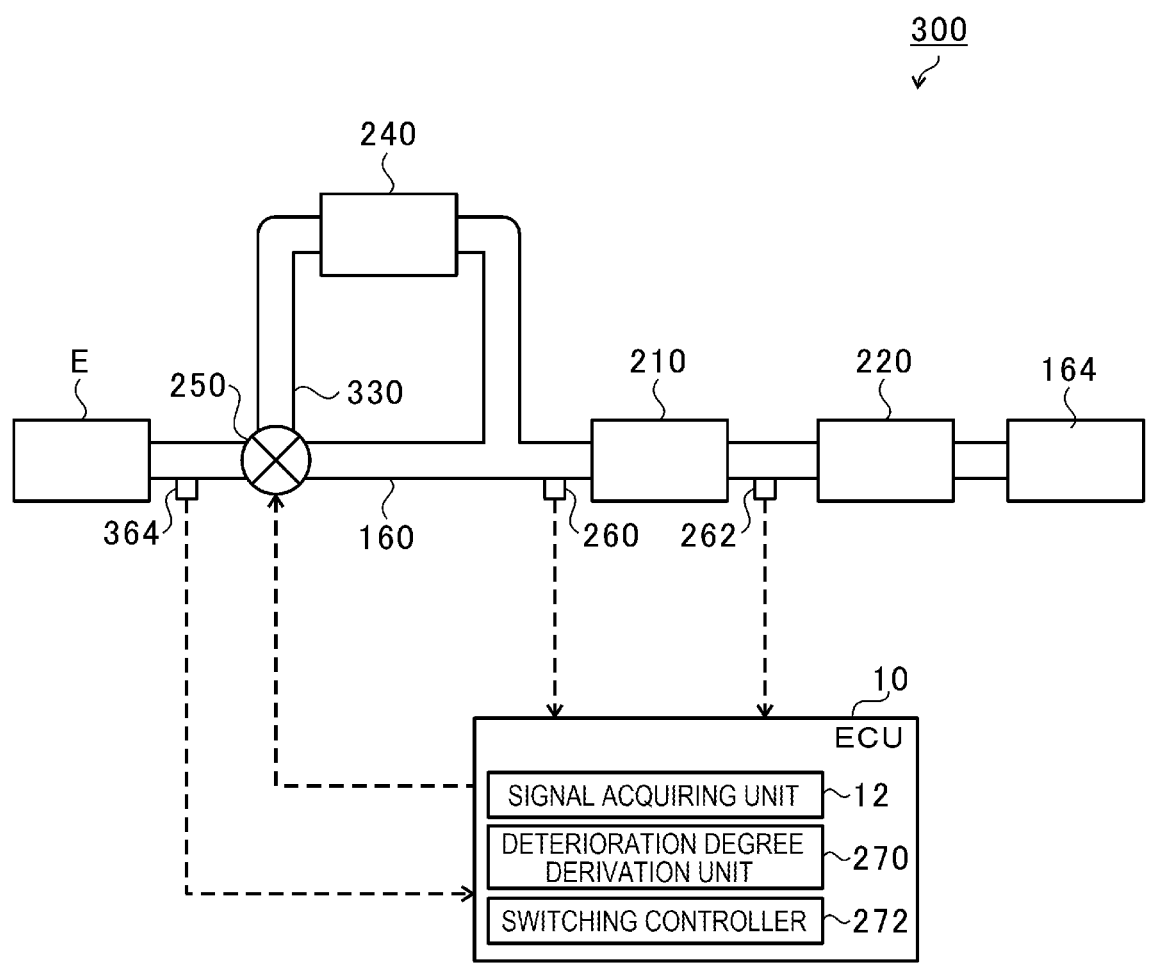
FIG. 4 illustrates an exhaust gas purification device of a modification.

FIG. 4 illustrates an exhaust gas purification device 300 of a modification. In FIG. 4, signal flows are indicated by dashed arrows. As illustrated in FIG. 4, the exhaust gas purification device 300 includes the front stage catalyst 210, the rear stage catalyst 220, a bypass pipe 330, the hydrocarbon adsorbent 240, the switching valve 250, the air-fuel ratio sensor 260, the downstream air-fuel ratio sensor 262, a temperature sensor 364, the signal acquiring unit 12, the deterioration degree derivation unit 270, and the switching controller 272. Elements that are substantially the same as those of the exhaust gas purification device 200 are designated by the same reference numerals, and description thereof will be omitted.

In the modification, the bypass pipe 330 branches from a first portion of the exhaust pipe 160 that is located upstream of the front stage catalyst 210 and is recoupled to a second portion of the exhaust pipe 160 that is located upstream of the front stage catalyst 210.

The temperature sensor 364 measures a temperature of an exhaust gas passing through an upstream of a branch position of the bypass pipe 330 in the exhaust pipe 160.

As described above, the exhaust gas purification device 300 of the modification includes the bypass pipe 330 branching from the first portion of the exhaust pipe 160 which is located upstream of the front stage catalyst 210 and recoupled to the second portion of the exhaust pipe which is located upstream of the front stage catalyst 210. Therefore, the hydrocarbon adsorbent 240 can adsorb most of hydrocarbons contained in the exhaust gas during the engine start. Accordingly, the exhaust gas purification device 300 can reduce an amount of a precious metal material of the rear stage catalyst 220 and improve a removal rate of hydrocarbons.

The embodiment of the disclosure has been described above with reference to the accompanying drawings. It is needless to say that the disclosure is not limited to such an embodiment. It is apparent that those skilled in the art would conceive various changes and modifications within the scope of the appended claims, and it is to be understood that such changes and modifications also fall within the technical scope of the disclosure.

The above embodiment describes, as an example, that the switching controller 272 stops the introduction of the exhaust gas into the bypass pipe 230 (that is, the hydrocarbon adsorbent 240) when the temperature Tex of the exhaust gas introduced into the hydrocarbon adsorbent 240 is equal to or higher than the temperature threshold Tt. However, when the temperature of the front stage catalyst 210 is equal to or higher than the temperature threshold Tt, the switching controller 272 may allow the exhaust gas to pass through the front stage catalyst 210 and the hydrocarbon adsorbent 240.

The above embodiment describes, as an example, that the OSC material contains the ceria-zirconia composite. However, the OSC material may simply contain ceria.

The above embodiment describes, as an example, that the deterioration degree derivation unit 270 derives the deterioration degree of the front stage catalyst 210 based on the air-fuel ratio difference. However, a method of deriving the deterioration degree of the front stage catalyst 210 by the deterioration degree derivation unit 270 is not limited to this method. For example, the deterioration degree derivation unit 270 may derive the deterioration degree of the front stage catalyst 210 based on a time during which the air-fuel ratio derived based on the oxygen concentration detected by the downstream air-fuel ratio sensor 262 is maintained at the theoretical air-fuel ratio. In this case, the time during which the air-fuel ratio is maintained at the theoretical air-fuel ratio decreases as the deterioration degree of the front stage catalyst 210 increases.

The above embodiment describes, as an example, that the exhaust gas purification device 200 includes the air-fuel ratio sensor 260 and the downstream air-fuel ratio sensor 262. However, the exhaust gas purification device 200 is not limited in configuration as long as an oxygen concentration (air-fuel ratio) upstream of the front stage catalyst 210 and an oxygen concentration (air-fuel ratio) downstream of the front stage catalyst 210 can be measured. For example, the exhaust gas purification device 200 may include an oxygen sensor instead of the air-fuel ratio sensor 260. The exhaust gas purification device 200 may include an oxygen sensor instead of the downstream air-fuel ratio sensor 262. The exhaust gas purification device 200 may include a $NO_x$ sensor instead of the air-fuel ratio sensor 260 and the downstream air-fuel ratio sensor 262.

The above embodiment and modification describe, as examples, that the exhaust gas purification devices 200 and 300 include the temperature sensors 264 and 364, respectively. However, none of the temperature sensors 264 and 364 may be provided. For example, the exhaust gas purification devices 200 and 300 may estimate the temperature of the exhaust gas based on a combustion state of the engine E, so as to estimate the temperature of the exhaust gas introduced into the bypass pipes 230 and 330.

The ECU 10 illustrated in FIGS. 1 and 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 10 illustrated in FIGS. 1 and 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ECU 10 illustrated in FIGS. 1 and 2.

The invention claimed is:

1. An exhaust gas purification device comprising:
a first catalyst provided in an exhaust pipe;
a second catalyst provided downstream of the first catalyst in the exhaust pipe;
a bypass pipe branching from a first portion of the exhaust pipe, the first portion being located upstream of the second catalyst, the bypass pipe being recoupled to a second portion of the exhaust pipe, the second portion being located upstream of the second catalyst;
a hydrocarbon adsorbent provided in the bypass pipe; and
a switching controller configured to switch a flow path of an exhaust gas to the bypass pipe based on a deterioration degree of the first catalyst when the deterioration degree of the first catalyst is equal to or higher than a deterioration threshold, wherein the deterioration degree is derived based on a detected value of an air-fuel ratio sensor and another detected value of a downstream air-fuel ratio sensor, and the deterioration threshold is an upper limit value of the deterioration degree of the first catalyst at which the first catalyst can remove hydrocarbons to a target value even during an engine start.

2. The exhaust gas purification device according to claim 1, wherein the switching controller is configured to switch the flow path to the bypass pipe based on a temperature of the exhaust gas introduced into the hydrocarbon adsorbent.

3. The exhaust gas purification device according to claim 2, wherein the switching controller is configured to stop introduction of the exhaust gas into the bypass pipe when the temperature of the exhaust gas introduced into the hydrocarbon adsorbent is equal to or higher than a temperature threshold.

4. The exhaust gas purification device according to claim 3, wherein the bypass pipe branches from between the first catalyst and the second catalyst in the exhaust pipe, and is recoupled to between the first catalyst and the second catalyst in the exhaust pipe.

5. The exhaust gas purification device according to claim 3, wherein the first portion of the exhaust pipe is located upstream of the first catalyst, and the second portion of the exhaust pipe is located upstream of the first catalyst.

6. The exhaust gas purification device according to claim 2, wherein the bypass pipe branches from between the first catalyst and the second catalyst in the exhaust pipe, and is recoupled to between the first catalyst and the second catalyst in the exhaust pipe.

7. The exhaust gas purification device according to claim 2, wherein the first portion of the exhaust pipe is located upstream of the first catalyst, and the second portion of the exhaust pipe is located upstream of the first catalyst.

8. The exhaust gas purification device according to claim 1, wherein the bypass pipe branches from between the first catalyst and the second catalyst in the exhaust pipe, and is recoupled to between the first catalyst and the second catalyst in the exhaust pipe.

9. The exhaust gas purification device according to claim 1, wherein the first portion of the exhaust pipe is located upstream of the first catalyst, and the second portion of the exhaust pipe is located upstream of the first catalyst.

10. An exhaust gas purification device comprising:
a first catalyst provided in an exhaust pipe;
a second catalyst provided downstream of the first catalyst in the exhaust pipe;
a bypass pipe branching from a first portion of the exhaust pipe, the first portion being located upstream of the second catalyst, the bypass pipe being recoupled to a second portion of the exhaust pipe, the second portion being located upstream of the second catalyst;
a hydrocarbon adsorbent provided in the bypass pipe; and
circuitry configured to switch a flow path of an exhaust gas to the bypass pipe based on a deterioration degree of the first catalyst when the deterioration degree of the first catalyst is equal to or higher than a deterioration threshold, wherein the deterioration degree is derived based on a detected value of an air-fuel ratio sensor and another detected value of a downstream air-fuel ratio sensor, and the deterioration threshold is an upper limit value of the deterioration degree of the first catalyst at which the first catalyst can remove hydrocarbons to a target value even during an engine start.

* * * * *